: US 8,174,740 B2
: May 8, 2012

(12) United States Patent
Baxter et al.

(54) DIFFUSE SURFACE ON LENSLET ARRAY DIFFUSER

(75) Inventors: Nicholas Baxter, Welwyn Garden City (GB); Brian Reid, Welwyn Garden City (GB)

(73) Assignee: Xerox Corporation, Norwalk, CT (US)

( * ) Notice: Subject to any disclaimer, the term of this patent is extended or adjusted under 35 U.S.C. 154(b) by 536 days.

(21) Appl. No.: 12/406,399

(22) Filed: Mar. 18, 2009

(65) Prior Publication Data
US 2010/0238526 A1    Sep. 23, 2010

(51) Int. Cl.
*H04N 1/04*    (2006.01)

(52) U.S. Cl. ......... 358/488; 358/509; 358/474; 358/475

(58) Field of Classification Search .................. 358/488, 358/509, 474, 475
See application file for complete search history.

(56) References Cited

U.S. PATENT DOCUMENTS

| 5,707,684 | A  | * | 1/1998  | Hayes et al.      | 427/162 |
| 6,975,949 | B2 |   | 12/2005 | Mestha et al.     |         |
| 2002/0135825 | A1 | * | 9/2002 | Lee et al.        | 358/509 |
| 2004/0081799 | A1 | * | 4/2004 | Kaminsky et al.   | 428/141 |
| 2008/0055674 | A1 | * | 3/2008 | Wilsher et al.    | 358/488 |

* cited by examiner

*Primary Examiner* — Houshang Safaipour
(74) *Attorney, Agent, or Firm* — Pillsbury Winthrop Shaw Pittman LLP

(57) ABSTRACT

An illuminator system includes an illuminator array positioned adjacent to an image bearing surface, a light diffuser, and a linear sensor array. The light diffuser includes a plurality of rounded lenslets having convex or concave configuration positioned between the illuminator array and the image bearing surface. The rounded lenslets are positioned with respect to the illuminator array to receive the light beams emitted by the illuminator elements and to diffuse the light beams being transmitted to the image bearing surface in the linear direction of the illuminator array. Each of the rounded lenslets has a textured surface with a plurality of indentations. Each of the indentations is configured to randomly diffuse the light beams being transmitted to the image bearing surface.

23 Claims, 7 Drawing Sheets

DIFFUSE SURFACE ON LENSLET ARRAY DIFFUSER

FIELD

The present disclosure relates to an illuminator system and a method for reducing the color non-uniformity of a captured image within a scanner.

BACKGROUND

When using an array of light emitting diodes (LEDs) to illuminate a document within a scanner, there are a number of problems to overcome due to the 'point source' nature of LEDs versus the 'continuous source' nature of a fluorescent lamp.

One problem associated with the point source nature of LEDs is the effect of specular reflection, particularly at the document edge. The effect of the specular reflection may also be found in the centerfolds of glossy documents, however, the effect may be prominent at the document edge as the edge curves away from the image bearing surface and the glossy documents reflect light back into the sensor. The effect of specular reflection occurs where a glossy surface directly reflects the light from an illumination source onto an imaging sensor. With a continuous illumination source such as a lamp, this specular reflection may be seen as a white stripe in the cross-process (or fast scan) direction at the edge of the document. However, an array of point illumination sources, such as LEDs, may create a periodic pattern of white marks 200 at the document edge. This periodic pattern of white marks 200 is more objectionable in comparison with the continuous white line from a lamp. FIGS. 1A and 1B show images used to highlight the effect of specular reflection. FIG. 1A shows an image scanned with the continuous source of illumination, such as a lamp, where as FIG. 1B shows an image scanned with the point source of illumination, such as LEDs. The specular reflection can be seen on the left hand side of each image, where the fold in the spine of the document is located.

One solution to reduce the effect of "specular reflection" is proposed and is discussed in detail in U.S. patent application Ser. No. 12/014,361, incorporated herein by reference. This solution used a different light guide design, such as collimator lenses, to collimate the light from the LED and hence to reduce the effect of "specular reflection".

Another problem associated with point source nature of LEDs is a lack of color uniformity. The solution proposed in U.S. patent application Ser. No. 12/014,361 does not address or solve the lack of color uniformity.

SUMMARY

In an embodiment, an illuminator system is provided. The illuminator system includes an illuminator array positioned adjacent to an image bearing surface, a light diffuser, and a linear sensor array. The illuminator array includes a plurality of discrete illuminator elements spaced in a linear arrangement. The illuminating elements each being configured to emit a light beam for transmission to the image bearing surface at an incidence angle. The light diffuser includes a plurality of rounded lenslets having convex or concave configuration positioned between the illuminator array and the image bearing surface. The rounded lenslets are positioned with respect to the illuminator array to receive the light beams emitted by the illuminator elements and to diffuse the light beams being transmitted to the image bearing surface in the linear direction of the illuminator array. Each of the rounded lenslets has a textured surface with a plurality of indentations. The indentations are configured to randomly diffuse the light beams being transmitted to the image bearing surface. The linear sensor array includes a plurality of sensors positioned adjacent to the image bearing surface such that the light beams reflecting off the image bearing surface at a reflectance angle are received by the sensors.

In another embodiment, a method for reducing the color non-uniformity is provided. The method includes emitting light beams to an image bearing surface at an incidence angle using an illuminator array comprising a plurality of discrete illuminator elements spaced in a linear arrangement adjacent to the image bearing surface, wherein a light diffuser is positioned between the illuminator array and the image bearing surface, the light diffuser comprising a plurality of rounded lenslets each having a textured surface with a plurality of indentations; wherein the plurality of rounded lenslets receive the light beams emitted by the illuminator elements and diffuse the lights beams being transmitted to the image bearing surface in the linear direction of the illuminator array, with the indentations further diffusing the light beams randomly; and receiving the light beam reflecting off the image bearing surface at a reflectance angle with a linear sensor array comprising a plurality of sensors adjacent to the image bearing surface.

Other aspects, features, and advantages will become apparent from the following detailed description, and the accompanying drawings.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1A:
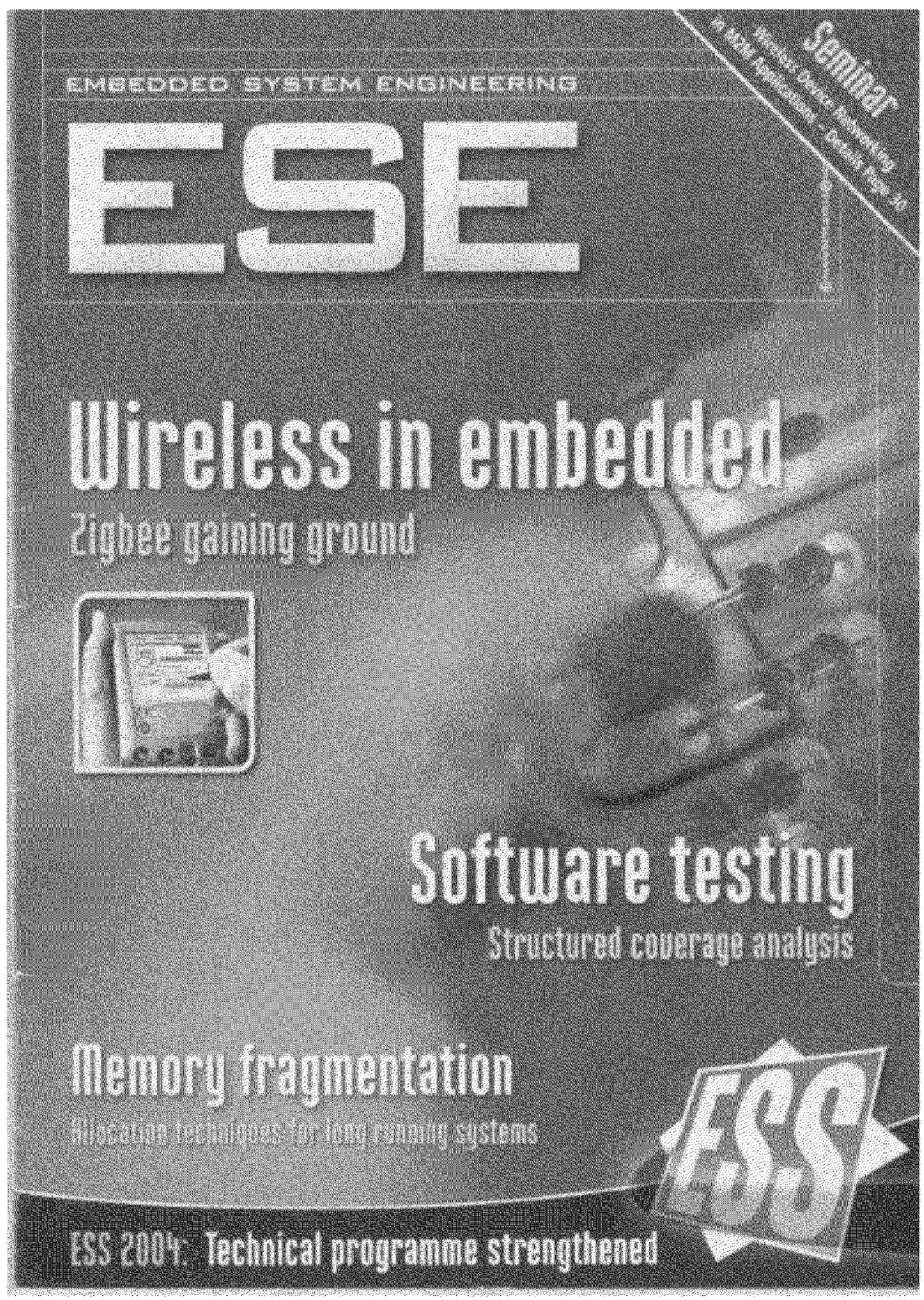
FIG. 1A shows an image that is scanned using a fluorescent lamp.
Figure 1B:
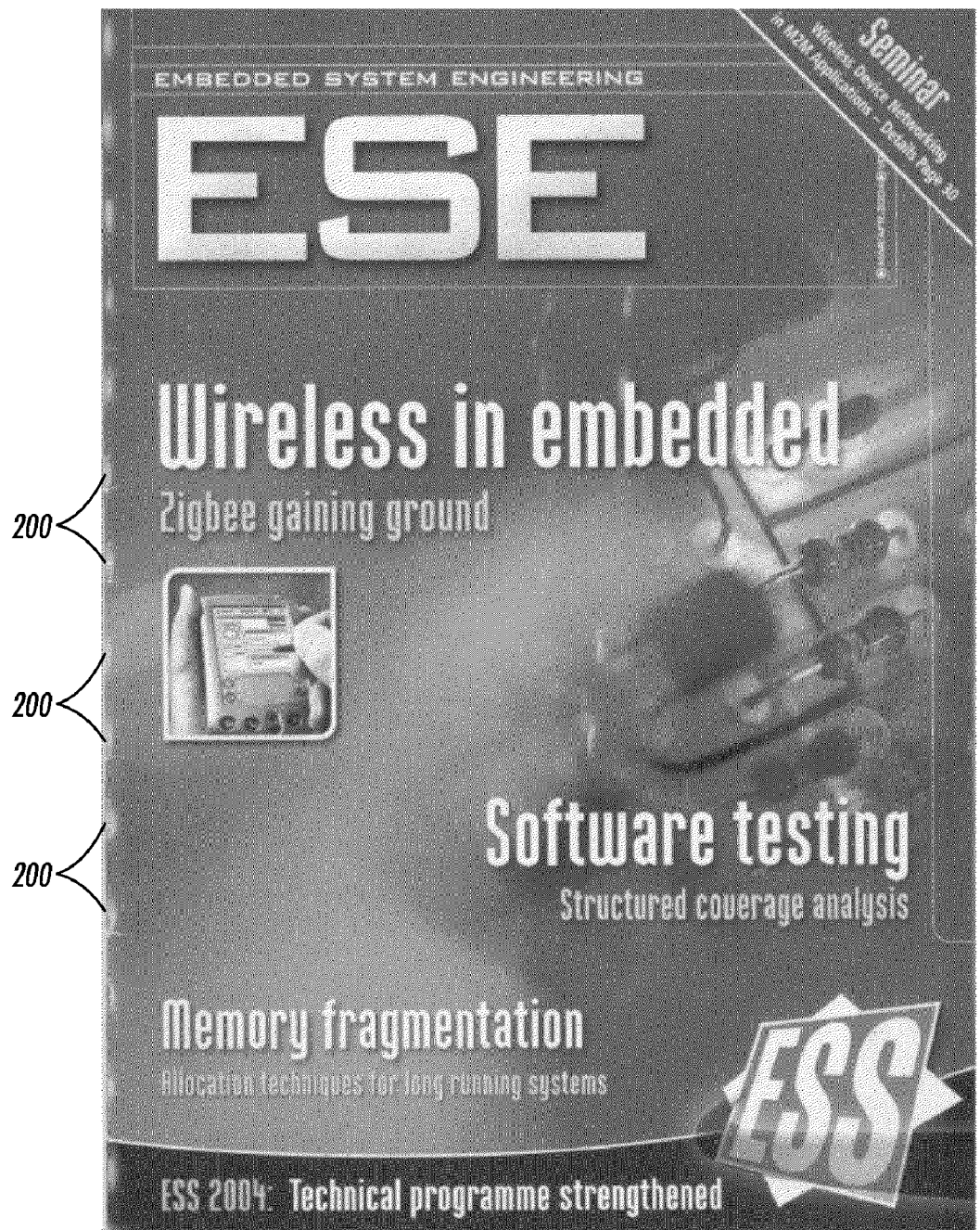
FIG. 1B shows an image that is scanned using an array of LEDs.
Figure 2:
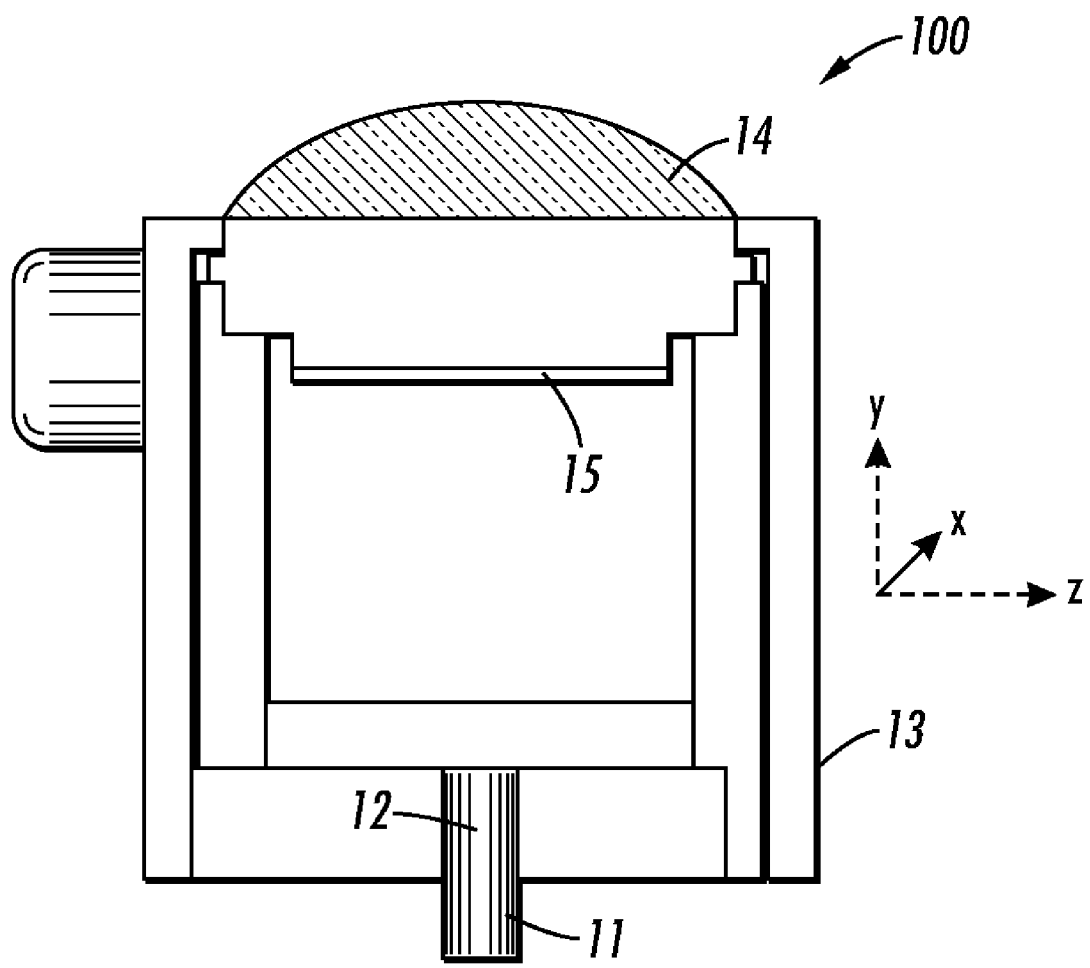
FIG. 2 is a cross-sectional view of an illuminator array along with a diffuser.

The lack of color uniformity on the captured image within a scanner originates from the construction of the LEDs. The construction of LEDs often includes a blue LED die with a yellow phosphor coating. FIG. 2 shows a cross-sectional view of a known LED illuminator along with a diffuser. The LED illumination 100 comprises an LED array 11, a reflector 13, a lens 14, and a diffuser 15. Each LED array 11 includes of a row of LEDs 12, where the LEDs 12 are separated from each other by a distance. In one embodiment, the LEDs 12 are separated from each other by a distance of 10.5 mm. In another embodiment, the LED array 11 may include a row of thirty LEDs. In one embodiment, the LEDs 12 are contained within a housing, which is generally referred to as the reflector 13. In one embodiment, the distance between the surface of the LED 12 to the diffusing surface on lens 14 is approximately 6 nm. The top surface of the lens 14 is convex to collect the light and focus it towards an imaging point in the z-direction. The diffuser 15 is placed in the lower surface of the lens 14 (i.e., between the lens 14 and the LEDs 12) so that the light in the x-direction (into the page) is dispersed. Therefore, by using the diffuser 15, the point illumination of the LEDs 12 appear to be a continuous illumination.

Figure 3:
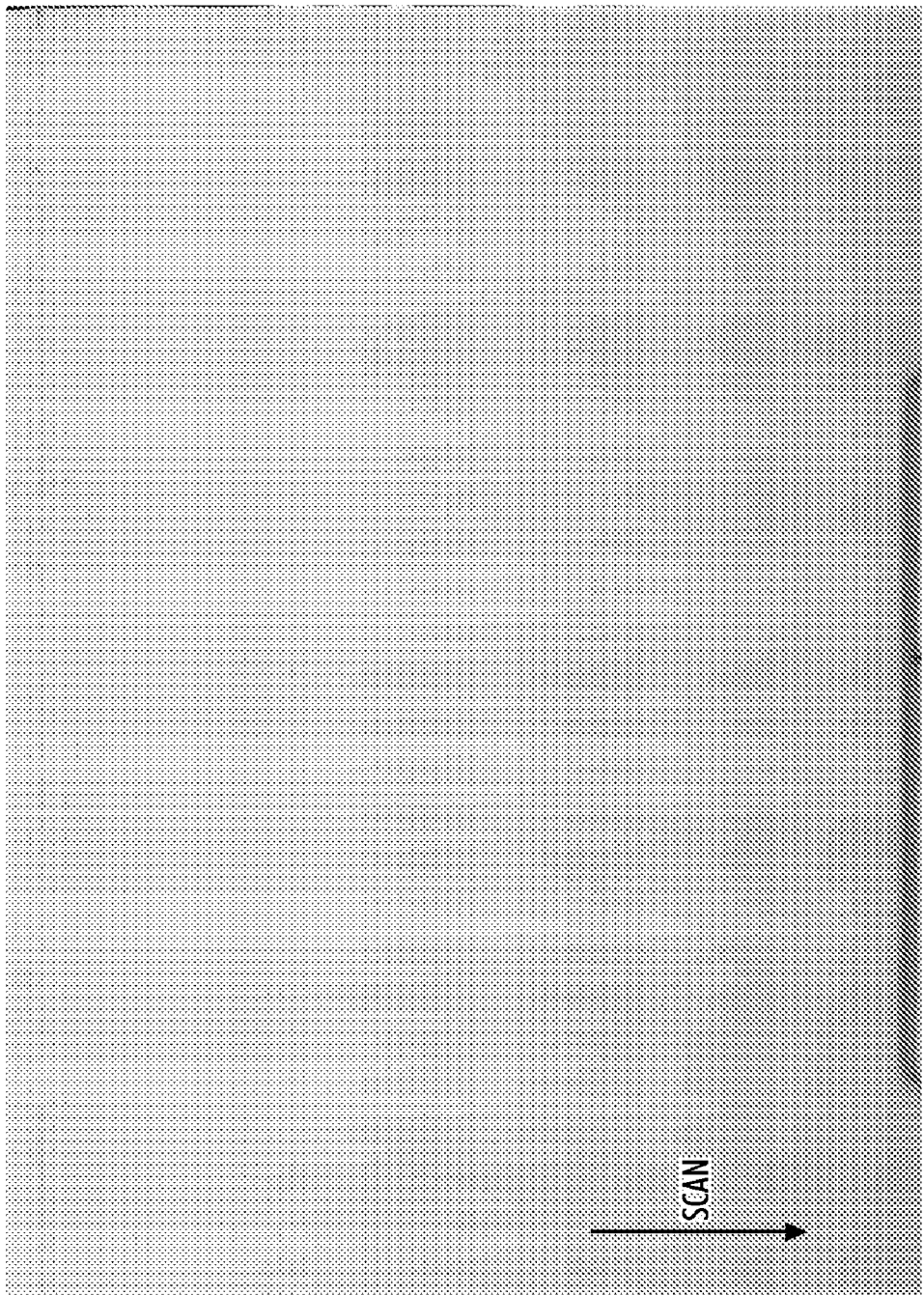
FIG. 3 shows an image showing color non-uniformity as visible strips in the process (or slow scan) direction.

The lack of color uniformity on the captured image within the scanner is shown in FIG. 3. The color non-uniformity in the image can be seen as visible stripes in the process (or slow scan) direction. The visible stripes line up with the location of the LEDs 12 on the LED array 11. The effect of color non-uniformity is predominantly visible in the blue channel of the captured image. The red and green channels remain relatively uniform. Also, the color non-uniformity occurs when there is a difference in the height of the target above an image bearing surface relative to the height of the calibration strip. In one embodiment, a target in the form of a uniform white card is placed on the image bearing surface. The target is gradually raised from one end to the other end of the scan. Specifically, the target is configured to rest on the image bearing surface at one end and is raised by a distance at the other end of the scan. In one embodiment, the other end of the target is raised by a distance of 4 mm above the image bearing surface. The raised target configuration aids in evaluating the distribution of light with varying height.

Figure 4:
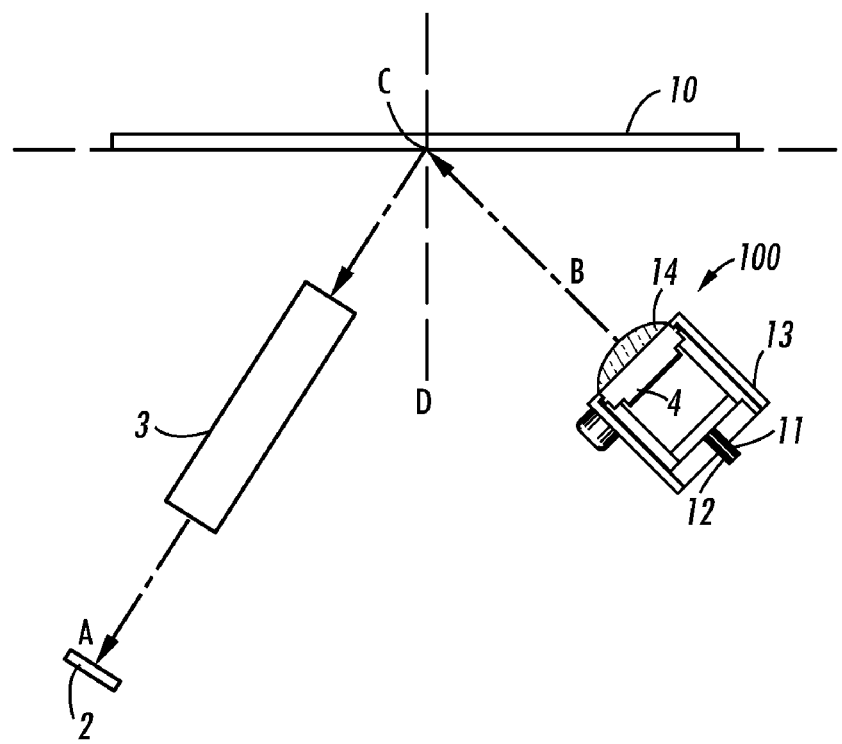
FIG. 4 is a cross-sectional view of the LED illuminator system and an image bearing surface.

FIG. 4 shows an LED illuminator system using a light diffuser with an array of rounded lenslets each having convex or concave configuration to reduce the color non-uniformity. The illuminator system includes an illuminator array 11, a image bearing surface 10, the light diffuser 4 comprising plurality of rounded lenslets, a lens array 3, and a linear sensor array 2.

The illuminator array 11 with a plurality of discrete illuminator elements, which are spaced in a linear arrangement, is described in detail with respect to FIG. 2. In one embodiment, the linear LED array 11 could also use more than one row of LEDs 2. The combination of a linear array sensor 2 and linear LED array allows for high spatial resolution (e.g., 600 spots per inch) in both the process and cross-process directions. The LED arrays could be all one color, e.g., white or of multiple colors, as described in U.S. Pat. No. 6,975,949, incorporated herein by reference. Other discrete light sources are also contemplated, such as fiber optic light guide tubes. In one embodiment, the image bearing surface 10 is a platen. However, it may also be the printed document, or any other surface bearing an image.

Figure 5:
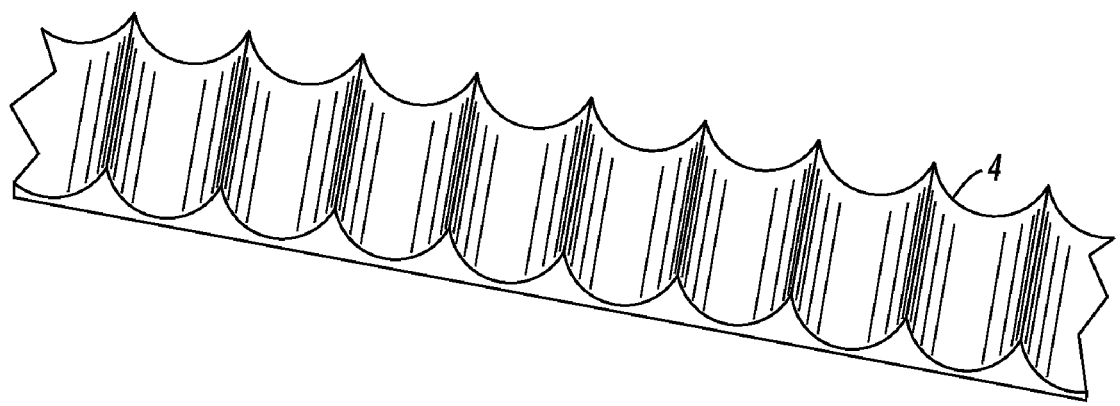
FIG. 5 is a perspective view of a concave lenslets diffuser.
Figure 6:
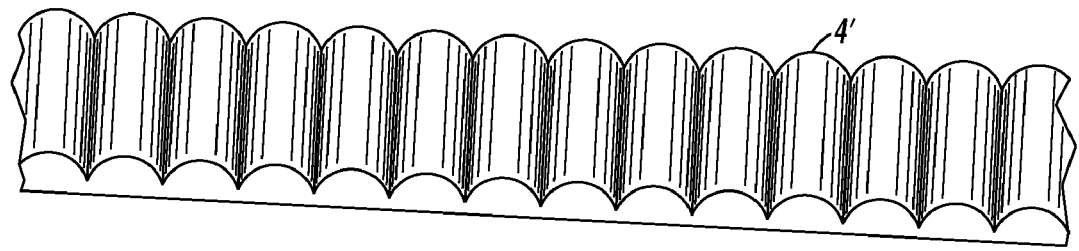
FIG. 6 is a perspective view of a convex lenslets diffuser.

The light diffuser 4 includes a plurality of rounded lenslets each having convex or concave configuration (as can be seen in FIGS. 5 and 6). The light diffuser 4 with the plurality of rounded lenslets is positioned between the illuminator array 11 and the image bearing surface 10, and preferably between the lens 14 and the LEDs 12 (and more preferably on the surface of the lens 14, at the same plane as the diffuser 15 in FIG. 2). The rounded lenslets are positioned with respect to the illuminator array 11 to receive the light beams emitted by the illuminated elements of the illuminator array 11. In the illustrated embodiment, the face of the light diffuser 4 having the opposite flat surface engages with the lens 14. The rounded lenslets diffuse the light beams emitted by the illuminated elements of the illuminator array 11 for transmission to the image bearing surface 10 at an incidence angle θ, where the incidence angle θ is less than a predetermined acceptance angle α of the lens array 3. In one embodiment, each rounded lenslets of the light diffuser 4 is a concave lenslets. In another embodiment, each rounded lenslets of the light diffuser 4' is a convex lenslets. The rounded lenslets are made from plastic, glass or any other transparent material as would be appreciated by one skilled in the art. In one embodiment, the lenses may be made from a polycarbonate. Preferably, the lenslet material has a higher refractive index than the medium outside the lens. This medium will typically be air, so almost all transparent materials will have a higher refractive index. However, in the event the surrounding medium is a liquid or vacuum, more specific materials may be used to ensure a higher refractive index.

FIG. 5 shows a concave lenslets diffuser 4 used in one embodiment of the present disclosure. The radius of curvature for the concave lenslets diffuser is 0.25 mm. The peaks separation (i.e., pitch) for the concave lenslets diffuser is 0.5 mm and the total depth from the peaks to the opposite surface of the lenslet diffuser is about 0.3 mm. FIG. 6 shows a convex lenslets diffuser 4' that may be used in another embodiment of the present disclosure. The convex lenslets diffuser 4' shown in FIG. 7 may have has the same dimensions, i.e., the peaks separation and the peak to trough depth, as the concave lenslets diffuser shown in FIG. 6.

Figure 8:
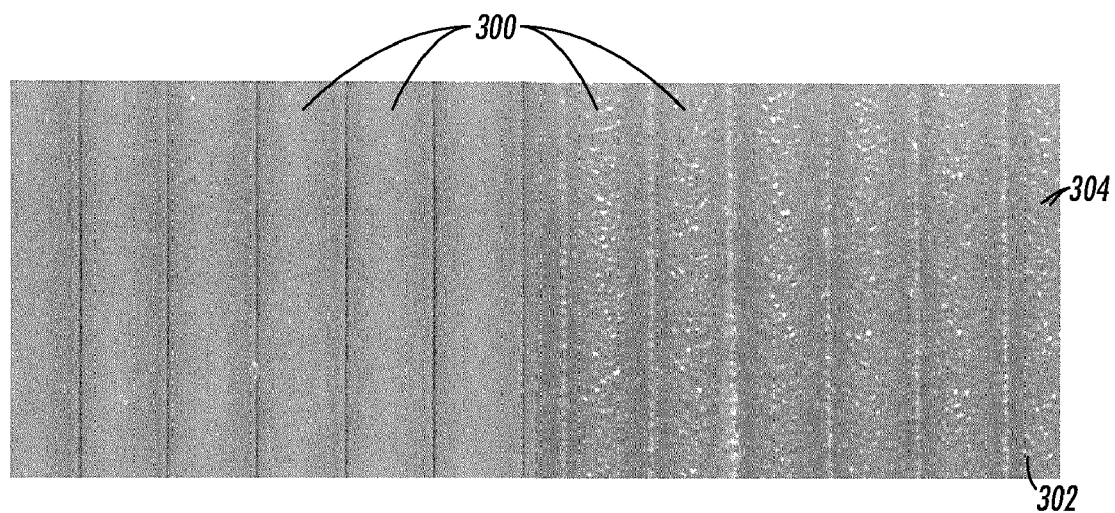
FIG. 8 shows an image of the rounded lenslets of the light diffuser, where the left half of the image shows the rounded lenslets before bead blasting process while the right half of the image shows the rounded lenslets after bead blasting.

Referring to FIG. 8, each of the rounded lenslets 300 may have a textured surface 302 with a plurality of indentations 304. Each of the indentations 304 is configured to randomly diffuse the light beams being transmitted to the image bearing surface 10 (as shown in FIG. 4).

The textured surface 302 provides a diffuse scattering characteristic to the rounded lenslets 300. In one embodiment, the textured surface 302 of the rounded lenslets 300 may be achieved by bead blasting. FIG. 8 shows an image where the left half of the image shows the rounded lenslets 300 before bead blasting process while the right half of the image shows the rounded lenslets 300 after bead blasting. The bead blasting is configured to create the textured surface 302 with the plurality of indentations 304. The indentations 304 are configured to randomly diffuse the light beams being transmitted to the image bearing surface 10 (as shown in FIG. 5). In other words, the indentations 304 are configured to diffusely transmit light beams as they pass through the rounded lenslets 300.

In one embodiment, during the bead blasting process a plurality of beads (e.g., made of glass) are blown under high pressure at the surface of the rounded lenslets. The collisions of these plurality of beads onto the surface of the rounded lenslets are configured to create the plurality of indentations (i.e., pits). Each of these indentations act as an individual lens to spread out the light beams coming from the illuminating elements (i.e., LEDs). It is contemplated that the textured surface of the rounded lenslets may be created by various methods, and is not just limited to the bead blasting described above. For example, shot blasting might also be used. In another embodiment, the rounded lenslets may be molded with the textured surface formed thereon.

Referring back to FIG. 4, the lens array 3, such as a Selfoc® lens or other microlens arrangement with the predetermined acceptance angle α, may be interposed between the image bearing surface 10 and the linear sensor array 2. A Selfoc® lens is a gradient index lens which consists of fiber rods with parabolic index profile. In one embodiment, the Selfoc® lens has an acceptance angle α of about ±9 degrees. In one embodiment, the lens array 3 is placed in the optical path of the light beams reflecting off the image bearing surface 10 at a reflectance angle.

Preferably, the linear sensor array 2 is, for example, a full width array (FWA) sensor. A full width array sensor is defined as a sensor that extends substantially an entire width (perpendicular to a direction of motion) of the moving image bearing surface. The full width array sensor is configured to detect any desired part of the printed image, while printing real images. The full width array sensor may include a plurality of sensors equally spaced at intervals (e.g., every 1/600th inch (600 spots per inch)) in the cross-process (or fast scan) direction. See for example, U.S. Pat. No. 6,975,949, incorporated herein by reference. It is understood that other linear array sensors may also be used, such as contact image sensors, CMOS array sensors or CCD array sensors.

In one embodiment, a processor (not shown) is configured to process the light beams reflecting off the image bearing surface 10 and detected by the linear sensor array 2. In other embodiment, the processor is provided to both calibrate the sensor and to process the reflectance data detected by the linear sensor array 2. The processor could be dedicated hardware like ASICs or FPGAs, software, or a combination of dedicated hardware and software.

In one embodiment, a document to be scanned may generally be fixed in position on the image bearing surface 10, and a scanner carriage (not shown) may be configured to move underneath the document to capture the image. In this embodiment, the scanner carriage may include illumination sources, such as lamps, LED illuminators, a lamp along with a reflector or a mirror, or a LED illuminator along with a reflector or a mirror. The illumination sources may be a part of the sensor carriage. The illumination sources may be configured to move along with the sensor carriage. It is also contemplated that the system may include moving mirrors to direct the reflected light from the document to a fixed image sensor.

As shown in FIG. 4, the illuminator array 11 is located on a line B-C and is configured to emit a light beam that passes through the light diffuser 4 having the rounded lenslets. The rounded lenslets of the light diffuser 4 are also located on the line B-C. The light beams from the rounded lenslets of the light diffuser 4 are incident onto the image bearing surface 10 at point C, which is reflected, thereby producing a reflectance in a direction along line C-A. The angle (∠ACD) between line A-C and normal line D-C is substantially different to the angle (∠BCD) between line B-C and normal line D-C, such that the illuminator array 11 is configured to emit a light beam onto the image bearing surface 10 at point C, thereby producing a reflectance from the image bearing surface 10 at a reflectance angle along line A-C. The linear sensor array 2 is positioned adjacent to the image bearing surface 10 and is located along line A-C, such that it captures the light beam reflecting off the image bearing surface 10 at a reflectance angle at point C. The difference in angles ∠ACD and ∠BCD is preferred to minimize the amount of specular reflectance directed to the sensor 2. Line C-D represents a normal line to the surface at a point C of the image bearing surface 10. Point C may actually be a line or region on the surface of the image bearing surface 10.

Figure 7:
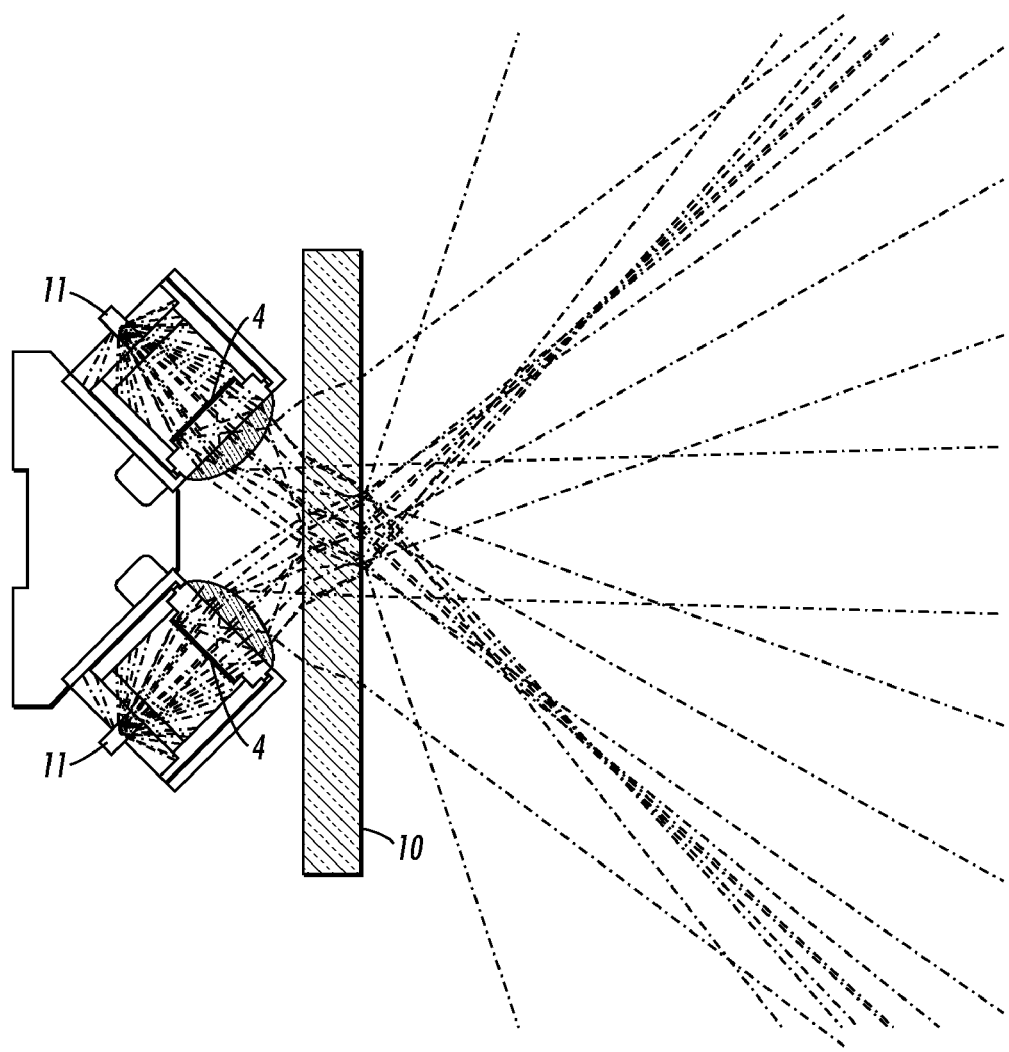
FIG. 7 is a cross-sectional view of the scanner with the LED illuminator system and the image bearing surface.

FIG. 7 is a cross-sectional view of the scanner with the LED illuminator system and the image bearing surface. The scanner includes the illuminator array 11 that is placed at the angle with respect to the image bearing surface 10. In one embodiment (shown), two illuminator arrays 11 are placed opposite to each other so as to illuminate a document in a scanner and to prevent any shadows or highlights on the captured image. In the illustrated embodiment, the two illuminator arrays are placed on opposite sides, however, it is contemplated that two lamps, a lamp with a reflector or mirror, or a LED illuminator with a reflector or mirror may be used in place of the two LED illuminator arrays. When using a reflector or a mirror along with the illumination source, the illumination source (e.g., lamp or LED illuminator) may be placed on one side and the reflector or the mirror may be place on the opposite side. A small number of light rays were represented by dashed lines. As shown in FIG. 7, the scanner includes the light diffuser 4 having rounded lenslets with the concave or convex configuration, where each of the rounded lenslets has a textured surface with the plurality of indentations as described in the present disclosure.

The present disclosure combines the textured surface of the rounded lenslets of the light diffuser with the shape of the diffuser (i.e., having rounded lenslets) to eliminate the problem of color nonuniformities. The experimental results performed using the bead-blasted lenslet array of the present disclosure showed that the residual "yellow stripe" color non-uniformities were eliminated. The present disclosure may be used with any illuminator system having multiple LEDs arranged in an array, where uniform illumination of such illuminator system is desirable.

While the present disclosure has been described in connection with specific embodiments, it is to be understood that the inventive concept is capable of further modifications, and is not to be limited to the disclosed embodiments, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential hereinbefore set forth and followed in the spirit and scope of the appended claims.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present disclosure, the structural components illustrated herein are drawn to scale. It is to be expressly understood, however, that the drawings are for the purpose of illustration and description only and are not a limitation of the present disclosure. In addition, it should be appreciated that structural features shown or described in any one embodiment herein can be used in other embodiments as well. As used in the specification and in the claims, the singular form of "a", "an", and "the" include plural referents unless the context clearly dictates otherwise.

What we claim is:

1. A system for reducing the color non-uniformities in an image captured by a scanning device, the system comprising:
an illuminator array positioned adjacent to an image bearing surface, the illuminator array comprising a plurality of discrete illuminator elements spaced in a linear arrangement, the illuminating elements each being configured to emit a light beam for transmission to the image bearing surface at an incidence angle;
a light diffuser comprising a plurality of rounded lenslets having convex or concave configuration positioned between the illuminator array and the image bearing surface, the rounded lenslets being positioned with respect to the illuminator array to receive the light beams emitted by the illuminator elements and to diffuse the light beams being transmitted to the image bearing surface in the linear direction of the illuminator array; and a linear sensor array comprising a plurality of sensors positioned adjacent to the image bearing surface such that the light beams reflecting off the image bearing surface at a reflectance angle are received by the sensors, wherein each of the rounded lenslets has a textured surface with a plurality of indentations, the indentations being configured to randomly diffuse the light beams being transmitted to the image bearing surface so as to reduce the color non-uniformities in the captured image.

2. The system of claim 1, wherein the rounded lenslets is a convex lenslets.

3. The system of claim 1, wherein the rounded lenslets is a concave lenslets.

4. The system of claim 1, wherein the illuminator array comprises a linear LED array, wherein each discrete illuminator comprises an LED.

5. The system of claim 1, further comprising a lens placed in the optical path of the light beams reflecting off the image bearing surface at the reflectance angle.

6. The system of claim 5, wherein the lens is a gradient index lens.

7. The system of claim 1, wherein the linear sensor array is a full width array (FWA) sensor, contact image sensor, a CMOS array sensor or a CCD array sensor.

8. The system of claim 1, further comprising a processor configured to process the light beams reflecting off the image bearing surface and detected by the linear sensor array.

9. The system of claim 1, wherein the textured surface with the plurality of indentations is formed by bead blasting process.

10. The system of claim 1, wherein the textured surface with the plurality of indentations is molded on the rounded lenslets.

11. A method for reducing the color non-uniformities in an image captured by a scanning device, the method comprising:

emitting light beams to an image bearing surface at an incidence angle using an illuminator array comprising a plurality of discrete illuminator elements spaced in a linear arrangement adjacent to the image bearing surface, wherein a light diffuser is positioned between the illuminator array and the image bearing surface, the light diffuser comprising a plurality of rounded lenslets each having a textured surface with a plurality of indentations, wherein the plurality of rounded lenslets receive the light beams emitted by the illuminator elements and diffuse the lights beams being transmitted to the image bearing surface in the linear direction of the illuminator array, with the indentations further diffusing the light beams randomly so as to reduce the color non-uniformities in the captured image; and receiving the light beams reflecting off the image bearing surface at a reflectance angle with a linear sensor array comprising a plurality of sensors adjacent to the image bearing surface.

12. The method of claim 11, wherein the rounded lenslets is a convex lenslets.

13. The method of claim 11, wherein the rounded lenslets is a concave lenslets.

14. The method of claim 11, wherein the illuminator array comprises a linear LED array, wherein each discrete illuminator comprises an LED.

15. The method of claim 11, further comprising a lens placed in the optical path of the light beams reflecting off the image bearing surface at the reflectance angle.

16. The method of claim 15, wherein the lens is a gradient index lens.

17. The method of claim 11, wherein the linear sensor array is a full width array (FWA) sensor, contact image sensor, a CMOS array sensor or a CCD array sensor.

18. The method of claim 11, further comprising a processor configured to process the light beams reflecting off the image bearing surface and detected by the linear sensor array.

19. The method of claim 11, wherein the textured surface with the plurality of indentations is formed by bead blasting process.

20. The method of claim 11, wherein the textured surface with the plurality of indentations is molded on the rounded lenslets.

21. The system of claim 1, further comprising a lens arrangement positioned between the light diffuser and the image bearing surface.

22. The system of claim 21, wherein the light diffuser is positioned at the same plane as a lower surface of the lens arrangement.

23. The system of claim 1, wherein a radius of curvature for each rounded lenslet is 0.25 millimeters, a height for each rounded lenslet is 0.3 millimeters, and a pitch for the rounded lenslets diffuser is 0.5 millimeters.

* * * * *